US012575590B2

(12) United States Patent
Nakada et al.

(10) Patent No.: US 12,575,590 B2
(45) Date of Patent: Mar. 17, 2026

(54) MASKING AGENT

(71) Applicant: AJINOMOTO CO., INC., Tokyo (JP)

(72) Inventors: Yuji Nakada, Kawasaki (JP); Yayoi Kawato, Kawasaki (JP); Shingo Sugiyama, Kawasaki (JP); Seiji Kitajima, Kawasaki (JP); Chiori Ijichi, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 444 days.

(21) Appl. No.: 17/934,344

(22) Filed: Sep. 22, 2022

(65) Prior Publication Data

US 2023/0028073 A1     Jan. 26, 2023

Related U.S. Application Data

(63) Continuation of application No. PCT/JP2021/011368, filed on Mar. 19, 2021.

(30) Foreign Application Priority Data

Mar. 26, 2020    (JP) ................................. 2020-056158

(51) Int. Cl.
*A23L 27/00*        (2016.01)
*A23L 27/20*        (2016.01)

(52) U.S. Cl.
CPC ............. *A23L 27/84* (2016.08); *A23L 27/203* (2016.08); *A23L 27/204* (2016.08); *A23L 27/2052* (2016.08)

(58) Field of Classification Search
CPC ....................................................... A23L 27/84
See application file for complete search history.

(56) References Cited

U.S. PATENT DOCUMENTS

| | | | |
|---|---|---|---|
| 4,988,527 A | 1/1991 | Buckholz, Jr. et al. | |
| 2005/0008718 A1 | 1/2005 | Subbiah | |
| 2014/0050835 A1* | 2/2014 | Backes | A23L 27/84 |
| | | | 426/655 |
| 2017/0055548 A1* | 3/2017 | Chakraborty | A23L 27/20 |
| 2020/0037636 A1 | 2/2020 | Matsuura et al. | |
| 2021/0127719 A1* | 5/2021 | Kiefl | A23L 5/27 |

FOREIGN PATENT DOCUMENTS

| | | |
|---|---|---|
| JP | 53-34946 | 3/1978 |
| JP | 2001-197874 A | 7/2001 |
| JP | 2010-246449 A | 11/2010 |
| JP | 2010-279414 A | 12/2010 |
| JP | 2011-167144 A | 9/2011 |
| JP | 2012-143190 A | 8/2012 |
| JP | 2013-189385 A | 9/2013 |
| JP | 103892137 A | 7/2014 |
| JP | 2015-181349 A | 10/2015 |
| JP | 2017-176163 A | 10/2017 |
| JP | 2018-115327 A | 7/2018 |
| JP | 2018-153101 A | 10/2018 |
| JP | 2019-71851 A | 5/2019 |
| JP | 2019-97490 A | 6/2019 |
| JP | 2019-103408 A | 6/2019 |
| JP | 6574887 B1 | 8/2019 |
| JP | 2019-170375 A | 10/2019 |
| JP | 2020-156473 A | 10/2020 |
| WO | WO 2018/113925 A1 | 6/2018 |
| WO | WO 2019/228957 A1 | 12/2019 |
| WO | WO 2019/230903 A1 | 12/2019 |

OTHER PUBLICATIONS

Boatright "Compounds Contributing to the "beany" odor of aqueous solution of soy protein isolates", Journal of Food Science, 1999, 64(6), pp. 667-670 (Year: 1999).*

Vercellotti "Lipid Oxidation in Foods; An overview", in chapter 1 of ACS Symposium Series: American Chemical Society: Washington, DC, 1992, pp. 1-11 (Year: 1992).*

Zhang, "Off-Flavor Related Volatiles in Soymilk as Affected by Soybean Variety, Grinding, and Heat-Processing Methods", Journal of Agricultural and Food Chemistry, 2012, 60, pp. 7457-7462 (Year: 2012).*

Office Action issued Mar. 27, 2024, in corresponding European Patent Application No. 21776662.5, 18 pages.

Roland Wibke S. U. et al., "Flavor Aspects of Pulse Ingredients", Cereal Chemistry, vol. 94, No. 1 (2016), XP093140264, pp. 58-65.

Sabrina Schindler et al., "Lactic fermentation to improve the aroma of protein extracts of sweet lupin (*Lupinus angustifolius*)", Food Chemistry, Elsevier Ltd, NL, vol. 128, No. 2 (2011), XP028198940, pp. 330-337.

Katherine Holmgaard Bak et al., "Hexanal as a Predictor of Development of Oxidation Flavor in Cured and Uncured Deli Meat Products as Affected by Natural Antioxidants", Foods, vol. 10, No. 152 (2021), XP093141046, pp. 1-12.

Kathrine Holmgaard Bak et al., "Hexanal as a marker of oxidation flavour in sliced and uncured deli turkey with and without phosphates using rosemary extracts", International Journal of Food Science and Technology, Blackwell Scientific Publications, Oxford, GB, vol. 55, No. 9 (2020), XP071858181, pp. 3104-3110.

Combined Chinese Office Action and Search Report issued Oct. 18, 2023, in corresponding Chinese Patent Application No. 202180024062.4 (with English Translation and English Translation of Category of Cited Documents), 18 pages.

Extended European Search Report issued May 16, 2024, in corresponding European Patent Application No. 21776662.5, 15 pages.

Communication pursuant to Rules 70(2) and 70a(2) EPC issued Jun. 5, 2024, in corresponding European Patent Application No. 21776662.5, 1 page.

* cited by examiner

*Primary Examiner* — Changqing Li
(74) *Attorney, Agent, or Firm* — Oblon, McClelland, Maier & Neustadt, L.L.P.

(57)        ABSTRACT

An agent containing at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methyl-thio)propane, nootkatone, 1,4-dioxacycloheptadecane-5,17-dione, sclareol, and sclareolide is effective for masking an unpleasant smell and for making oral products in which an unpleasant smell is masked.

14 Claims, No Drawings

MASKING AGENT

CROSS REFERENCES TO RELATED APPLICATIONS

This application is a continuation of International Patent Application No. PCT/JP2021/011368, filed on Mar. 19, 2021, and claims priority to Japanese Patent Application No. 2020-056158, filed on Mar. 26, 2020, both of which are incorporated herein by reference in their entireties.

BACKGROUND OF THE INVENTION

Field of the Invention

The present invention relates to masking agents for an unpleasant smell derived from a plant or oxidation of fats and oils, a method for masking the unpleasant smell, and methods for producing an oral product in which the unpleasant smell is masked.

Discussion of the Background

Various foods made from soybean as a starting material and aiming at nutritional enhancement, health maintenance, and the like have high nutritional values and are frequently used. The development of foods containing soybean materials has been increasing in recent years. In addition, soy meat made for vegetarians and vegans by compress-drying soybeans is becoming popular as a low-fat, high-protein foodstuff among those other than vegetarians. However, a green flavor containing hexanal as a main component, which is known as an unpleasant smell contained in soybeans, various plants, and processed products thereof, prevents continuous use.

In addition, the smell of oxidized oil and fat containing hexanal as a main component, which is the smell of oxidized oil and fat contained in processed fish meat products and processed livestock meat products, also poses a problem at the manufacturing sites and distribution.

Conventionally, masking of an unpleasant smell by covering it with an aroma component having a stronger smell than such smell is known. For example, it has been reported with regard to photodegradation odor such as methional and the like of fruit juice-containing products that various compounds such as hexanal can mask the photodegradation odor (see JP-A-2019-170375, which is incorporated herein by reference in its entirety). In addition, it has been reported that the characteristic odor of poly(phenol sulfide), which is widely used as an additive in many industrial fields, can be masked by a combination of aldehydes such as hexanal and the like, and specific compounds such as alcohols and the like (see JP-A-2018-115327, which is incorporated herein by reference in its entirety).

Until now, a green flavor with hexanal as the main component, such as soybean and the like, has also been masked by adding herb, processed tomato, and citric acid, which have a stronger flavor than the hexanal odor (see Soyprotein research, Vol. 14 (2011), 111-115, and JP-A-2019-071851, both of which are incorporated herein by reference in their entireties). However, since such method could only be used for foods that match the flavor of the addition substance itself, a technique for masking the green flavor without impairing the flavor of various foods has been demanded.

SUMMARY OF THE INVENTION

Accordingly, it is one object of the present invention to provide a masking agent for an unpleasant smell of a plant or a processed meat product, particularly a green smell of soybean or a degraded odor of fat and oil (hexanal odor).

It is another object of the present invention to provide a masking method of a hexanal odor.

It is another object of the present invention to provide a production method of a food in which a hexanal odor is masked.

These and other objects, which will become apparent during the following detailed description, have been achieved by the present inventors' discovery that a hexanal odor can be effectively masked by adding a specific aroma compound at a low concentration around the threshold value of the aroma (flavor) of the compound, without imparting the aroma of the compound, which resulted in the completion of the present invention.

Accordingly, the present invention provides the following.

(1) An agent for masking an unpleasant smell of an oral product, comprising at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide.

(2) The agent of (1), wherein the unpleasant smell of the oral product is a plant-derived unpleasant smell of a plant-containing oral product.

(3) The agent of (2), wherein the plant is a bean.

(4) The agent of (2), wherein the plant is a soybean.

(5) The agent of (1), wherein the unpleasant smell of the oral product is an unpleasant smell derived from oxidation of fat or oil in a processed meat product.

(6) The agent of any of (1) to (5), wherein the unpleasant smell is a hexanal odor.

(7) The agent of any of (1) to (6), wherein the aroma compound is added to the oral product in an amount corresponding to $1/100$ to 100 times a threshold value of the aroma compound in the oral product.

(8) A method for masking an unpleasant smell of an oral product, comprising adding at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide.

(9) The method of (8), wherein the unpleasant smell of the oral product is a plant-derived unpleasant smell of a plant-containing oral product.

(10) The method of (9), wherein the plant is a bean.

(11) The method of (9), wherein the plant is a soybean.

(12) The method of (8), wherein the unpleasant smell of the oral product is an unpleasant smell derived from oxidation of fat or oil in a processed meat product.

(13) The method of any of (8) to (12), wherein the unpleasant smell is a hexanal odor.

(14) The method of any of (8) to (13), wherein the aroma compound is added to the oral product in an amount corresponding to $1/100$ to 100 times a threshold value of the aroma compound in the oral product.

(15) A method for producing an oral product in which an unpleasant smell is masked, comprising adding at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide to the oral product.

(16) The method of (15), wherein the oral product is a plant-containing oral product.

(17) The method of (16), wherein the plant is a bean.

(18) The method of (16), wherein the plant is a soybean.

(19) The method of (15), wherein the oral product is a processed meat product.

(20) The method of any of (15) to (19), wherein the aroma compound is added in an amount corresponding to $1/100$ to 100 times a threshold value of the aroma compound in the oral product.

(21) The method of (15), wherein the unpleasant smell is a plant-derived unpleasant smell of a plant-containing oral product.

(22) The method of (21), wherein the plant is a bean.

(23) The method of (21), wherein the plant is a soybean.

(24) The method of (19), wherein the unpleasant smell is an unpleasant smell derived from oxidation of fat or oil in a processed meat oral product.

(25) The method of any of (15) to (24), wherein the unpleasant smell is a hexanal odor.

Advantageous Effects of Invention

According to the present invention, foods, pharmaceutical products, and the like which contain plants such as soybean and the like and in which hexanal odor is masked can be provided and can be ingested over a long period of time.

According to the present invention, since hexanal odor can be masked without imparting other flavor, various processed foods can be produced.

According to the present invention, foods, pharmaceutical products, and the like which contain plants and in which a green smell such as soybean smell or the like, a grain smell, and an unpleasant smell derived from oxidation of fat or oil are masked can be provided and can be ingested easily.

According to the present invention, since a green smell such as soybean smell or the like, and a grain smell can be masked without imparting other flavor, various processed foods can be produced.

DETAILED DESCRIPTION OF THE PREFERRED EMBODIMENTS

The present invention relates to an agent for masking an unpleasant smell of an oral product, containing at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide (referred to as "the agent of the present invention" at times in the present specification).

In the present invention, the aroma compound refers to a compound used as a flavor, and is a low-molecular-weight compound having a molecular weight of about 140 to 310. Specifically, the following 12 kinds can be mentioned:

E-beta-damascone (CAS Registry Number: 23726-91-2, also indicated as (E)-1-(2,6,6-trimethyl-1-cyclohexenyl)-2-buten-1-one)

S-(2-methyl-3-furyl)ethanethioate (CAS Registry Number: 55764-25-5)

beta-caryophyllene oxide (CAS Registry Number: 1139-30-6)

beta-ionone (CAS Registry Number: 79-77-6)

2,5-dihydroxy-1,4-dithiane (CAS Registry Number: 40018-26-6)

methyl anthranilate (CAS Registry Number: 134-20-3)

S-furfuryl thioformate (CAS Registry Number: 59020-90-5)

1-isothiocyanate-3-(methylthio)propane (CAS Registry Number: 505-79-3)

nootkatone (CAS Registry Number: 4674-50-4)

1,4-dioxacycloheptadecane-5,17-dione (CAS Registry Number: 105-95-3)

sclareol (CAS Registry Number: 515-03-7)

sclareolide (CAS Registry Number: 564-20-5).

The aroma compound to be used in the present invention may be a compound produced by a method known per se (e.g., chemical synthesis method, enzyme method, fermentation method, etc.) or a method analogous thereto, or an isolated product obtained by extraction and purification from a material containing an aroma compound. Examples of the material containing an aroma compound include naturally occurring substances such as agricultural/livestock/aquatic products and the like; fermentation products such as culture medium, bacterial cells, and the like obtained by culturing microorganisms; and processed products thereof, and the like. A commercially available product may be used as the aroma compound.

In the present invention, a material containing an aroma compound may be used as it is or purified to a desired degree and used in place of a chemically synthesized product or isolated product of the aroma compound, or in addition to the chemically synthesized product or isolated product.

In the agent of the present invention, only one kind of the above-mentioned aroma compound may be contained alone, or two or more kinds thereof may be contained in combination.

The amount of the aroma compound contained in the agent of the present invention is generally not less than 0.001 wt %, preferably not less than 0.1 wt %, particularly preferably not less than 1 wt %, with respect to the agent of the present invention. The amount is generally not more than 100 wt %, preferably not more than 99 wt %, more preferably not more than 90 wt %, with respect to the agent of the present invention.

The form of the agent of the present invention is not particularly limited, and examples thereof include solid (including powder, granule, etc.), liquid (including slurry, etc.), gel, paste, and the like.

The agent of the present invention may consist only of an aroma compound, or may further contain, in addition to the compound, a conventional base, depending on the form of the agent of the present invention.

When the agent of the present invention is in the form of a solid, the base includes, for example, starch, dextrin, cyclodextrin, various saccharides such as sucrose and glucose, protein, peptide, salt, solid fat, silicon dioxide, mixtures thereof, yeast bacterial cell, various powder extracts, and the like.

When the agent of the present invention is in the form of a liquid, the base includes, for example, water, ethanol, glycerol, propylene glycol, various animal and vegetable oils, and the like.

The agent of the present invention may further contain, in addition to the aroma compound, for example, excipient, pH adjuster, antioxidant, thickening stabilizer, emulsifier, sweetener (e.g., sugar, etc.), salt, organic salt, inorganic salt, nucleic acid, seasoning (e.g., umami seasonings such as sodium glutamate and the like, etc.), acidulant, colorant, food color former, and the like, as long as the object of the present invention is not impaired.

The agent of the present invention can be produced by a method known per se or a method analogous thereto.

The agent of the present invention can be preferably used to mask the unpleasant smell of an oral product (e.g., food, oral medicine, etc.) to which a plant is added, or processed meat products. Particularly, the agent of the present invention can be more preferably used for masking a plant-derived unpleasant smell of oral products, for example, soybean green smell derived from soybean in the beans, or unpleasant smell derived from oxidation of fat or oil in a processed meat product (fat and oil degradation odor), particularly, a hexanal odor causing them.

In the present invention, the plant includes beans such as soybean, peanut, pea, and the like, fruits such as apple, banana, strawberry, and the like, grains such as rice, barley, and the like, oilseeds such as rapeseed, corn, and the like, tomato, potato, olive fruit, and the like. Among these, beans are preferred, and soybean is more preferred.

In the present invention, the plant includes not only the aforementioned plants per se but also materials derived from such plants. For example, in the case of soybean, soybean per se and soybean-derived materials can be mentioned and, as the soybean-derived material, materials processed and treated from soybean as a starting material can be mentioned. For example, soybean oil, soymilk, whole fat soybean, defatted soybean, concentrated soyprotein, separated soyprotein, soy flour (roasted soybean flour), tofu refuse, and tofu can be mentioned.

The plant-derived unpleasant smell which can be masked by the agent of the present invention includes the odor itself that a plant inherently has, as well as an odor developed later by physical processing such as heating or the like of vegetable proteins, or effects over time on vegetable proteins by light, temperature, oxygen, or enzymes. In the case of soybean, for example, it is an unpleasant smell desired to be removed, such as bean smell or soybean green smell, grassy smell of tomato sauce and olive oil, and the like. As a specific plant-derived unpleasant smell, odor and the like of hexanal, hexanol, or 1-octen-3-ol can be mentioned. As the plant-derived unpleasant smell for which the agent of the present invention is suitable, soybean-derived unpleasant smell, particularly hexanal odor, can be mentioned.

Specific examples of the plant-derived unpleasant smell include odors and the like of hexanal, hexanol, 1-octen-3-ol, and decadienal. Examples of the plant-derived unpleasant smell for which the agent of the present invention is suitable include unpleasant smells derived from soyprotein and fat, particularly hexanal odor and decadienal odor.

When the unpleasant smell to be masked is a plant-derived unpleasant smell, the aroma compound contained in the agent of the present invention is one kind or a combination of two or more kinds selected from E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide. Among these, from the aspect of widely masking a plant-derived unpleasant smell, E-beta-damascone, beta-caryophyllene oxide, beta-ionone, 2,5-dihydroxy-1,4-dithiane, nootkatone, 1,4-dioxacycloheptadecane-5,17-dione, sclareol, and sclareolide are preferred, and E-beta-damascone, beta-caryophyllene oxide, beta-ionone, 2,5-dihydroxy-1,4-dithiane, nootkatone, 1,4-dioxacycloheptadecane-5,17-dione, and sclareol are more preferred.

In the present invention, the processed meat product means a processed food containing meat as a main starting material, and processed fish meat product and processed livestock meat product can be mentioned.

The unpleasant smell derived from oxidation of fat or oil which is masked by the agent of the present invention is an odor produced by changes in fat and oil components due to oxidation and the like, and a hexanal odor can be mentioned.

In addition, as a specific unpleasant smell derived from oxidation of fat or oil, a hexanal odor and a decadienal odor can be mentioned.

When the unpleasant smell to be masked is an unpleasant smell derived from oxidation of fat or oil, the aroma compound contained in the agent of the present invention is one kind or a combination of two or more kinds selected from E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-iso-thiocyanate-3-(methylthio)propane, nootkatone, 1,4-dioxa-cycloheptadecane-5,17-dione, sclareol, and sclareolide. Among these, from the aspect of widely masking an unpleasant smell derived from oxidation of fat or oil, E-beta-damascone, S-(2-methyl-3-furyl)ethanethioate, beta-caryo-phyllene oxide, beta-ionone, 2,5-dihydroxy-1,4-dithiane, methyl anthranilate, S-furfuryl thioformate, 1-isothiocya-nate-3-(methylthio)propane, nootkatone, 1,4-dioxacyclo-heptadecane-5,17-dione, and sclareol are preferred, and E-beta-damascone, beta-caryophyllene oxide, beta-ionone, 2,5-dihydroxy-1,4-dithiane, nootkatone, 1,4-dioxacyclohep-tadecane-5,17-dione, and sclareol are more preferred.

In the present invention, masking of an unpleasant smell means reduction or suppression of an unpleasant smell, and can also be referred to as deodorizing or reducing odor.

The oral product for which the agent of the present invention is used is not particularly limited as long as it contains a product having a plant-derived unpleasant smell, or is a processed meat product having an oil-and-fat oxidi-zation smell.

In the present invention, the "oral product" means a substance that can be ingested or taken orally, and specific examples thereof include food, oral medicine, and the like. In the present invention, the "food" broadly includes foods that can be ingested orally (excluding medicine), and unless otherwise specified, also includes so-called foods, bever-ages, seasonings, supplements, and the like. Food is a concept also including food compositions.

The food for which the agent of the present invention is used is not particularly limited as long as it contains a plant having a plant-derived unpleasant smell, and a plant per se, or a processed food using a plant or a plant-derived material can be mentioned. For example, soybean itself or a soybean processed food using soybean or a soybean-derived mate-rial, a tomato processed food, an olive processed food, and the like can be mentioned.

Examples of the soybean processed food include soymilk, soymilk beverage, prepared soymilk; soy flour prepared by pulverizing roasted beans (roasted soybean flour); tofu pre-pared from soymilk, dried bean curd, wheat gluten cake; freeze dry tofu prepared from tofu, thick fried tofu, Gan-modoki, fried tofu, broiled tofu, and the like; tofu refuse; boiled bean and steamed bean; fermented bean paste, fer-mented soybean, and the like each prepared from steamed beans.

The food for which the agent of the present invention is used also includes foods obtained by using these soybean processed foods as foodstuff, blending with other foodstuff as necessary, and cooking same. Examples thereof include, but are not limited to, confectioneries such as soymilk pudding, tofu refuse cake, cake with roasted soybean flour, tofu refuse cookie, cake with roasted soybean flour, nutrition bar with roasted soybean flour, Kinakonejiri, roasted soybean flour candy, and the like; bread such as low carbohydrate bread with roasted soybean flour, and the like; meat-containing foods such as soy meat, hamburg steak with soyprotein, meat ball, dumpling, steamed meat dumpling, fried cake of minced meat, deep-fried soyprotein, ham/sausage with soyprotein, and the like; nutrient enriched foods such as protein powder and nursing powdered milk for nutrient enrichment, and the like; noodle with soyprotein; batter for fried food with soyprotein; seafood-containing food such as fish sausage, fish cake, tube-shaped fish sausage or soup (including dried soup), and the like containing soyprotein; seasonings such as savory seasoning, flavor seasoning, menu seasoning, mayonnaise, dressing, sauce (e.g., demi-glace sauce, Japanese Worcestershire-style sauce, white sauce, cheese sauce, etc.) and the like; other processed foods; frozen food, and the like.

Examples of the tomato processed food include tomato sauce, concentrated tomato, tomato puree, tomato paste, tomato juice, solid tomato, and tomato soup.

Examples of the olive processed food include olive oil, olive paste, and the like.

In another embodiment, the food for which the agent of the present invention is used is not particularly limited as long as it is a processed meat product with an unpleasant smell derived from oxidation of fat or oil. Specific examples include fish processed foods such as minced marine meat, fish cake, crabmeat-like fish cake, floated-type fish cake, tube-shaped fish sausage, fried fish cake, minced fish, fish hum, fish sausage, fish ball, and the like, processed livestock meat products such as ham, bacon, sausage, barbecued pork, quenelle, hamburg steak, meat ball, meat loaf, roast beef, roast pork, roast chicken, and the like, canned foods thereof, retort packs thereof, and the like.

The food for which the agent of the present invention is used may be provided (sold, distributed) in a form suitable for eating, or may be provided in a form that requires a predetermined processing or cooking to have a form suitable for eating. For example, the food to which the agent of the present invention is used may be provided (sold, distributed) as a concentrate or the like that requires diluting with water, etc. to become a form suitable for eating.

The food for which the agent of the present invention is used may be provided, for example, as a food with health claims, a food for specified health uses, a food with nutrient function claims, a dietary supplement, a nutritional supplementary food, a health supplementary food, a food for medical use, a medical food, or the like.

Examples of the oral medicine to which the agent of the present invention is used include tablet, granule, powder, capsule (including soft capsule), elixir, syrup, microcapsule, drink, emulsion, suspension, and the like.

The method and conditions for adding the agent of the present invention to an oral product (e.g., food, oral medicine, etc.) are not particularly limited, and addition can be performed by a method known per se or a method analogous thereto, according to the form of the agent of the present invention, the kind of the oral product to which the agent of the present invention is added, and the like. The time when the agent of the present invention is added to an oral product is not particularly limited, and the agent can be added, for example, during the production of the oral product, after the production of the oral product, or the like. The agent of the present invention may be added to a starting material before producing the oral product.

In the agent of the present invention, from the aspect of efficient masking of a hexanal odor, the amount of the aroma compound to be added to an oral product is generally $1/100$ to 100 times, preferably $1/50$ to 50 times, more preferably $1/20$ to 20 times, further preferably $1/10$ to 10 times, the threshold value of the aroma compound.

When an aroma (smell) is produced by exceeding a certain concentration, the threshold value of an aroma compound means a standard of the concentration (minimum concentration necessary for producing an aroma). In the present invention, it means the maximum amount at which the flavor of the aroma compound is not felt (foreign flavor is not felt).

In the present invention, the amount of the aroma compound to be added to an oral product can be set according to the content of the components of the unpleasant smell, for example, the content of hexanal.

For example, when an oral product produced by adding soybean as one of the materials exhibits a soybean smell, the amount of the aroma compound to be added to the oral product can be set according to the amount of hexanal contained in the starting material.

Specifically, to effectively mask a hexanal odor by the agent of the present invention, the agent is preferably used such that the addition amount of the aroma compound to an oral product (amount of the aroma compound to be added to the oral product) is generally not less than $2\times10^{-2}$ weight ppm, preferably not less than $5\times10^{-2}$ weight ppm, more preferably not less than $1\times10^{-1}$ weight ppm, further preferably not less than $2\times10^{-1}$ weight ppm, with respect to the hexanal content of the oral product (amount of hexanal contained in the oral product).

In addition, to more effectively mask a hexanal odor by the agent of the present invention, the agent is preferably used such that the amount of the aroma compound to be added to an oral product is generally not more than $2\times10^{7}$ weight ppm, preferably not more than $1\times10^{7}$ weight ppm, more preferably not more than $5\times10^{6}$ weight ppm, further preferably not more than $2\times10^{6}$ weight ppm, with respect to the content of hexanal in the oral product. More details are as follows.

When the aroma compound is (1) E-beta-damascone, the agent of the present invention is preferably used such that an addition amount thereof to the oral product of (1) is generally not less than $2\times10^{-2}$ weight ppm, preferably not less than $5\times10^{-2}$ weight ppm, more preferably not less than $1\times10^{-1}$ weight ppm, further preferably not less than $2\times10^{-1}$ weight ppm, with respect to the content of hexanal in the oral product, because the agent can mask the hexanal odor more effectively. In this case, the agent of the present invention is preferably used such that an addition amount thereof to the oral product of (1) is generally not more than $2\times10^{2}$ weight ppm, preferably not more than $1\times10^{2}$ weight ppm, more preferably not more than $5\times10$ weight ppm, further preferably not more than $2\times10$ weight ppm, with respect to the content of hexanal in the oral product, because the agent can mask the hexanal odor particularly effectively.

When the aroma compound is (2) S-(2-methyl-3-furyl) ethanethioate, the agent of the present invention is preferably used such that an addition amount thereof to the oral product of (2) is generally not less than $2\times10^{-1}$ weight ppm, preferably not less than $5\times10^{-1}$ weight ppm, more preferably not less than 1 weight ppm, further preferably not less than 2 weight ppm, with respect to the content of hexanal in the oral product, because the agent can mask the hexanal odor more effectively. In this case, the agent of the present invention is preferably used such that an addition amount thereof to the oral product of (2) is generally not more than $2\times10^3$ weight ppm, preferably not more than $1\times10^3$ weight ppm, more preferably not more than $5\times10^2$ weight ppm, further preferably not more than $2\times10^2$ weight ppm, with respect to the content of hexanal in the oral product, because the agent can mask the hexanal odor particularly effectively.

When the aroma compound is (3) beta-caryophyllene oxide, the agent of the present invention is preferably used such that an addition amount thereof to the oral product of (3) is generally not less than $2\times10^{-1}$ weight ppm, preferably not less than $5\times10^{-1}$ weight ppm, more preferably not less than 1 weight ppm, further preferably not less than 2 weight ppm, with respect to the content of hexanal in the oral product, because the agent can mask the hexanal odor more effectively. In this case, the agent of the present invention is preferably used such that an addition amount thereof to the oral product of (3) is generally not more than $2\times10^3$ weight ppm, preferably not more than $1\times10^3$ weight ppm, more preferably not more than $5\times10^2$ weight ppm, further preferably not more than $2\times10^2$ weight ppm, with respect to the content of hexanal in the oral product, because the agent can mask the hexanal odor particularly effectively.

When the aroma compound is (4) beta-ionone, the agent of the present invention is preferably used such that an addition amount thereof to the oral product of (4) is generally not less than $2\times10^{-1}$ weight ppm, preferably not less than $5\times10^{-1}$ weight ppm, more preferably not less than 1 weight ppm, further preferably not less than 2 weight ppm, with respect to the content of hexanal in the oral product, because the agent can mask the hexanal odor more effectively. In this case, the agent of the present invention is preferably used such that an addition amount thereof to the oral product of (4) is generally not more than $2\times10^3$ weight ppm, preferably not more than $1\times10^3$ weight ppm, more preferably not more than $5\times10^2$ weight ppm, further preferably not more than $2\times10^2$ weight ppm, with respect to the content of hexanal in the oral product, because the agent can mask the hexanal odor particularly effectively.

When the aroma compound is (5) 2,5-dihydroxy-1,4-dithiane, the agent of the present invention is preferably used such that an addition amount thereof to the oral product of (5) is generally not less than 2 weight ppm, preferably not less than 5 weight ppm, more preferably not less than $1\times10$ weight ppm, further preferably not less than $2\times10$ weight ppm, with respect to the content of hexanal in the oral product, because the agent can mask the hexanal odor more effectively. In this case, the agent of the present invention is preferably used such that an addition amount thereof to the oral product of (5) is generally not more than $2\times10^4$ weight ppm, preferably not more than $1\times10^4$ weight ppm, more preferably not more than $5\times10^3$ weight ppm, further preferably not more than $2\times10^3$ weight ppm, with respect to the content of hexanal in the oral product, because the agent can mask the hexanal odor particularly effectively.

When the aroma compound is (6) methyl anthranilate, the agent of the present invention is preferably used such that an addition amount thereof to the oral product of (6) is generally not less than $2\times10$ weight ppm, preferably not less than $5\times10$ weight ppm, more preferably not less than $1\times10^2$ weight ppm, further preferably not less than $2\times10^2$ weight ppm, with respect to the content of hexanal in the oral product, because the agent can mask the hexanal odor more effectively. In this case, the agent of the present invention is preferably used such that an addition amount thereof to the oral product of (6) is generally not more than $2\times10^5$ weight ppm, preferably not more than $1\times10^5$ weight ppm, more preferably not more than $5\times10^4$ weight ppm, further preferably not more than $2\times10^4$ weight ppm, with respect to the content of hexanal in the oral product, because the agent can mask the hexanal odor particularly effectively.

When the aroma compound is (7) S-furfuryl thioformate, the agent of the present invention is preferably used such that an addition amount thereof to the oral product of (7) is generally not less than $2\times10$ weight ppm, preferably not less than $5\times10$ weight ppm, more preferably not less than $1\times10^2$ weight ppm, further preferably not less than $2\times10^2$ weight ppm, with respect to the content of hexanal in the oral product, because the agent can mask the hexanal odor more effectively. In this case, the agent of the present invention is preferably used such that an addition amount thereof to the oral product of (7) is generally not more than $2\times10^5$ weight ppm, preferably not more than $1\times10^5$ weight ppm, more preferably not more than $5\times10^4$ weight ppm, further preferably not more than $2\times10^4$ weight ppm, with respect to the content of hexanal in the oral product, because the agent can mask the hexanal odor particularly effectively.

When the aroma compound is (8) 1-isothiocyanate-3-(methylthio)propane, the agent of the present invention is preferably used such that an addition amount thereof to the oral product of (8) is generally not less than $2\times10^2$ weight ppm, preferably not less than $5\times10^2$ weight ppm, more preferably not less than $1\times10^3$ weight ppm, further preferably not less than $2\times10^3$ weight ppm, with respect to the content of hexanal in the oral product, because the agent can mask the hexanal odor more effectively. In this case, the agent of the present invention is preferably used such that an addition amount thereof to the oral product of (8) is generally not more than $2\times10^6$ weight ppm, preferably not more than $1\times10^6$ weight ppm, more preferably not more than $5\times10^5$ weight ppm, further preferably not more than $2\times10^5$ weight ppm, with respect to the content of hexanal in the oral product, because the agent can mask the hexanal odor particularly effectively.

When the aroma compound is (9) nootkatone, the agent of the present invention is preferably used such that an addition amount thereof to the oral product of (9) is generally not less than $2\times10^2$ weight ppm, preferably not less than $5\times10^2$ weight ppm, more preferably not less than $1\times10^3$ weight ppm, further preferably not less than $2\times10^3$ weight ppm, with respect to the content of hexanal in the oral product, because the agent can mask the hexanal odor more effectively. In this case, the agent of the present invention is preferably used such that an addition amount thereof to the oral product of (9) is generally not more than $2\times10^6$ weight ppm, preferably not more than $1\times10^6$ weight ppm, more preferably not more than $5\times10^5$ weight ppm, further preferably not more than $2\times10^5$ weight ppm, with respect to the content of hexanal in the oral product, because the agent can mask the hexanal odor particularly effectively.

When the aroma compound is (10) 1,4-dioxacyclohepta-decane-5,17-dione, the agent of the present invention is preferably used such that an addition amount thereof to the oral product of (10) is generally not less than $2\times10^2$ weight ppm, preferably not less than $5\times10^2$ weight ppm, more preferably not less than $1\times10^3$ weight ppm, further preferably not less than $2\times10^3$ weight ppm, with respect to the content of hexanal in the oral product, because the agent can mask the hexanal odor more effectively. In this, case, the agent of the present invention is preferably used such that an addition amount thereof to the oral product of (10) is generally not more than $2\times10^6$ weight ppm, preferably not more than $1\times10^6$ weight ppm, more preferably not more than $5\times10^5$ weight ppm, further preferably not more than $2\times10^5$ weight ppm, with respect to the content of hexanal in the oral product, because the agent can mask the hexanal odor particularly effectively.

When the aroma compound is (11) sclareol, the agent of the present invention is preferably used such that an addition amount thereof to the oral product of (11) is generally not less than $2\times10^3$ weight ppm, preferably not less than $5\times10^3$ weight ppm, more preferably not less than $1\times10^4$ weight ppm, further preferably not less than $2\times10^4$ weight ppm, with respect to the content of hexanal in the oral product, because the agent can mask the hexanal odor more effectively. In this case, the agent of the present invention is preferably used such that an addition amount thereof to the oral product of (11) is generally not more than $2\times10^7$ weight ppm, preferably not more than $1\times10^7$ weight ppm, more preferably not more than $5\times10^6$ weight ppm, further preferably not more than $2\times10^6$ weight ppm, with respect to the content of hexanal in the oral product, because the agent can mask the hexanal odor particularly effectively.

When the aroma compound is (12) sclareolide, the agent of the present invention is preferably used such that an addition amount thereof to the oral product of (12) is generally not less than $2\times10^3$ weight ppm, preferably not less than $5\times10^3$ weight ppm, more preferably not less than $1\times10^4$ weight ppm, further preferably not less than $2\times10^4$ weight ppm, with respect to the content of hexanal in the oral product, because the agent can mask the hexanal odor more effectively. In this case, the agent of the present invention is preferably used such that an addition amount thereof to the oral product of (12) is generally not more than $2\times10^7$ weight ppm, preferably not more than $1\times10^7$ weight ppm, more preferably not more than $5\times10^6$ weight ppm, further preferably not more than $2\times10^6$ weight ppm, with respect to the content of hexanal in the oral product, because the agent can mask the hexanal odor particularly effectively.

The content of hexanal in an oral product varies depending on the kind and content of the component contained in the oral product. For example, it is not less than about 100 ppb in a tasteless odorless aqueous solution, and not less than about 1 ppm in an oral product with a strong smell such as soymilk.

By adding the agent of the present invention to a plant-containing oral product (e.g., food, oral medicine, etc.), an unpleasant smell (particularly, hexanal odor, etc.) of the oral product can be masked.

In the agent of the present invention, from the aspect of efficient masking of a plant-derived unpleasant smell, the amount of the aroma compound to be added to an oral product is generally $1/100$ to 100 times, preferably $1/50$ to 50 times, more preferably $1/20$ to 20 times, further preferably $1/10$ to 10 times, the threshold value of the aroma compound.

In the present invention, the amount of the aroma compound to be added to an oral product can be set according to the content of the components of the plant-derived unpleasant smell such as green smell, grain smell, or the like, for example, the content of the above-mentioned soybean, soybean product, tomato, tomato product, and the like.

For example, when an oral product produced by adding soybean as one of the materials exhibits a soybean smell, the amount of the aroma compound to be added to the oral product can be set according to the amount of soybean contained in the starting material.

Specifically, to effectively mask a plant-derived unpleasant smell by the agent of the present invention, the agent is preferably used such that the amount (concentration) of the aroma compound to be added to an oral product having a plant-derived unpleasant smell is generally not less than 10 weight ppq, preferably not less than 100 weight ppqm, more preferably not less than 1 weight ppt. In addition, to more effectively mask a plant-derived unpleasant smell by the agent of the present invention, the agent is preferably used such that the amount (concentration) of the aroma compound to be added to the aforementioned oral product is generally not more than 10 weight ppm, preferably not more than 5 weight ppm, more preferably not more than 1 weight ppm. More details are as follows.

When the aroma compound is (1) E-beta-damascone, the agent of the present invention is preferably used such that an addition amount (concentration) thereof to the oral product of (1) having a plant-derived unpleasant smell is generally not less than 100 weight ppq, preferably not less than 200 weight ppq, more preferably not less than 500 weight ppq, further preferably not less than 1 weight ppt, particularly preferably not less than 5 weight ppt, most preferably not less than 10 weight ppt, because the agent can mask the plant-derived unpleasant smell more effectively. In this case, the agent of the present invention is preferably used such that an addition amount (concentration) thereof to the aforementioned oral product of (1) is generally not more than 1 weight ppb, preferably not more than 500 weight ppt, more preferably not more than 200 weight ppt, further preferably not more than 100 weight ppt, because the agent can mask the plant-derived unpleasant smell particularly effectively.

When the aroma compound is (2) S-(2-methyl-3-furyl) ethanethioate, the agent of the present invention is preferably used such that an addition amount (concentration) thereof to the oral product of (2) having a plant-derived unpleasant smell is generally not less than 100 weight ppq, preferably not less than 200 weight ppq, more preferably not less than 500 weight ppq, further preferably not less than 1 weight ppt, because the agent can mask the plant-derived unpleasant smell more effectively. In this case, the agent of the present invention is preferably used such that an addition amount (concentration) thereof to the aforementioned oral product of (2) is generally not more than 1 weight ppb, preferably not more than 500 weight ppt, more preferably not more than 200 weight ppt, further preferably not more than 100 weight ppt, because the agent can mask the plant-derived unpleasant smell particularly effectively.

When the aroma compound is (3) beta-caryophyllene oxide, the agent of the present invention is preferably used such that an addition amount (concentration) thereof to the oral product of (3) having a plant-derived unpleasant smell is generally not less than 1 weight ppt, preferably not less than 2 weight ppt, more preferably not less than 5 weight ppt, further preferably not less than 10 weight ppt, particularly preferably not less than 50 weight ppt, most preferably not less than 100 weight ppt, because the agent can mask the plant-derived unpleasant smell more effectively. In this case, the agent of the present invention is preferably used such that an addition amount (concentration) thereof to the aforementioned oral product of (3) is generally not more than 10 weight ppb, preferably not more than 5 weight ppb, more preferably not more than 2 weight ppb, further preferably not more than 1 weight ppb, because the agent can mask the plant-derived unpleasant smell particularly effectively.

When the aroma compound is (4) beta-ionone, the agent of the present invention is preferably used such that an addition amount (concentration) thereof to the oral product of (4) having a plant-derived unpleasant smell is generally not less than 10 weight ppq, preferably not less than 20 weight ppq, more preferably not less than 50 weight ppq, further preferably not less than 100 weight ppq, particularly preferably not less than 500 weight ppq, most preferably not less than 1 weight ppt, because the agent can mask the plant-derived unpleasant smell more effectively. In this case, the agent of the present invention is preferably used such that an addition amount (concentration) thereof to the aforementioned oral product of (4) is generally not more than 100 weight ppt, preferably not more than 50 weight ppt, more preferably not more than 20 weight ppt, further preferably not more than 10 weight ppt, because the agent can mask the plant-derived unpleasant smell particularly effectively.

When the aroma compound is (5) 2,5-dihydroxy-1,4-dithiane, the agent of the present invention is preferably used such that an addition amount (concentration) thereof to the oral product of (5) having a plant-derived unpleasant smell is generally not less than 10 weight ppt, preferably not less than 20 weight ppt, more preferably not less than 50 weight ppt, further preferably not less than 100 weight ppt, particularly preferably not less than 500 weight ppt, most preferably not less than 1 weight ppb, because the agent can mask the plant-derived unpleasant smell more effectively. In this case, the agent of the present invention is preferably used such that an addition amount (concentration) thereof to the aforementioned oral product of (5) is generally not more than 100 weight ppb, preferably not more than 50 weight ppb, more preferably not more than 20 weight ppb, further preferably not more than 10 weight ppb, because the agent can mask the plant-derived unpleasant smell particularly effectively.

When the aroma compound is (6) methyl anthranilate, the agent of the present invention is preferably used such that an addition amount (concentration) thereof to the oral product of (6) having a plant-derived unpleasant smell is generally not less than 10 weight ppt, preferably not less than 20 weight ppt, more preferably not less than 50 weight ppt, further preferably not less than 100 weight ppt, because the agent can mask the plant-derived unpleasant smell more effectively. In this case, the agent of the present invention is preferably used such that an addition amount (concentration) thereof to the aforementioned oral product of (6) is generally not more than 100 weight ppb, preferably not more than 50 weight ppb, more preferably not more than 20 weight ppb, further preferably not more than 10 weight ppb, because the agent can mask the plant-derived unpleasant smell particularly effectively.

When the aroma compound is (7) S-furfuryl thioformate, the agent of the present invention is preferably used such that an addition amount (concentration) thereof to the oral product of (7) having a plant-derived unpleasant smell is generally not less than 10 weight ppt, preferably not less than 20 weight ppt, more preferably not less than 50 weight ppt, further preferably not less than 100 weight ppt, because the agent can mask the plant-derived unpleasant smell more effectively. In this case, the agent of the present invention is preferably used such that an addition amount (concentration) thereof to the aforementioned oral product of (7) is generally not more than 100 weight ppb, preferably not more than 50 weight ppb, more preferably not more than 20 weight ppb, further preferably not more than 10 weight ppb, because the agent can mask the plant-derived unpleasant smell particularly effectively.

When the aroma compound is (8) 1-isothiocyanate-3-(methylthio)propane, the agent of the present invention is preferably used such that an addition amount (concentration)

thereof to the oral product of (8) having a plant-derived unpleasant smell is generally not less than 100 weight ppt, preferably not less than 200 weight ppt, more preferably not less than 500 weight ppt, further preferably not less than 1 weight ppb, because the agent can mask the plant-derived unpleasant smell more effectively. In this case, the agent of the present invention is preferably used such that an addition amount (concentration) thereof to the aforementioned oral product of (8) is generally not more than 1 weight ppm, preferably not more than 500 weight ppb, more preferably not more than 200 weight ppb, further preferably not more than 100 weight ppb, because the agent can mask the plant-derived unpleasant smell particularly effectively.

When the aroma compound is (9) nootkatone, the agent of the present invention is preferably used such that an addition amount (concentration) thereof to the oral product of (9) having a plant-derived unpleasant smell is generally not less than 1 weight ppb, preferably not less than 2 weight ppb, more preferably not less than 5 weight ppb, further preferably not less than 10 weight ppb, particularly preferably not less than 50 weight ppb, most preferably not less than 100 weight ppb, because the agent can mask the plant-derived unpleasant smell more effectively. In this case, the agent of the present invention is preferably used such that an addition amount (concentration) thereof to the oral product of (9) having a plant-derived unpleasant smell is generally not more than 10 weight ppm, preferably not more than 5 weight ppm, more preferably not more than 2 weight ppm, further preferably not more than 1 weight ppm, because the agent can mask the plant-derived unpleasant smell particularly effectively.

When the aroma compound is (10) 1,4-dioxacycloheptadecane-5,17-dione, the agent of the present invention is preferably used such that an addition amount (concentration) thereof to the oral product of (10) having a plant-derived unpleasant smell is generally not less than 1 weight ppb, preferably not less than 2 weight ppb, more preferably not less than 5 weight ppb, further preferably not less than 10 weight ppb, particularly preferably not less than 50 weight ppb, most preferably not less than 100 weight ppb, because the agent can mask the plant-derived unpleasant smell more effectively. In this case, the agent of the present invention is preferably used such that an addition amount (concentration) thereof to the aforementioned oral product of (10) is generally not more than 10 weight ppm, preferably not more than 5 weight ppm, more preferably not more than 2 weight ppm, further preferably not more than 1 weight ppm, because the agent can mask the plant-derived unpleasant smell particularly effectively.

When the aroma compound is (11) sclareol, the agent of the present invention is preferably used such that an addition amount (concentration) thereof to the oral product of (11) having a plant-derived unpleasant smell is generally not less than 1 weight ppb, preferably not less than 2 weight ppb, more preferably not less than 5 weight ppb, further preferably not less than 10 weight ppb, particularly preferably not less than 50 weight ppb, most preferably not less than 100 weight ppb, because the agent can mask the plant-derived unpleasant smell more effectively. In this case, the agent of the present invention is preferably used such that an addition amount (concentration) thereof to the aforementioned oral product of (11) is generally not more than 10 weight ppm, preferably not more than 5 weight ppm, more preferably not more than 2 weight ppm, further preferably not more than 1 weight ppm, because the agent can mask the plant-derived unpleasant smell particularly effectively.

When the aroma compound is (12) sclareolide, the agent of the present invention is preferably used such that an addition amount (concentration) thereof to the oral product of (12) having a plant-derived unpleasant smell is generally not less than 1 weight ppb, preferably not less than 2 weight ppb, more preferably not less than 5 weight ppb, further preferably not less than 10 weight ppb, particularly preferably not less than 50 weight ppb, most preferably not less than 100 weight ppb, because the agent can mask the plant-derived unpleasant smell more effectively. In this case, the agent of the present invention is preferably used such that an addition amount (concentration) thereof to the aforementioned oral product of (12) is generally not more than 10 weight ppm, preferably not more than 5 weight ppm, more preferably not more than 2 weight ppm, further preferably not more than 1 weight ppm, because the agent can mask the plant-derived unpleasant smell particularly effectively.

The content of a plant-derived unpleasant smell in an oral product varies depending on the kind and content of the component contained in the oral product. For example, it is not less than about 1 ppt in a tasteless odorless aqueous solution, and not less than about 10 ppt in an oral product with a strong smell such as soymilk.

By adding the agent of the present invention to a plant-containing oral product (e.g., food, oral medicine, etc.), an unpleasant smell (particularly, plant-derived unpleasant smell, etc.) of the oral product can be masked.

According to the present invention, the agent of the present invention and a plant-containing oral product can also be provided.

The present invention also provides a production method of an oral product in which an unpleasant smell is masked (simply referred to as "the production method of the present invention" at times in the present specification), including adding at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide to the oral product.

The aroma compound, oral product, and the like that may be used in the production method of the present invention are as defined above.

The addition amount of the aroma compound to the oral product (amount of the aroma compound to be added to the oral product) and preferable ranges in the production method of the present invention are as defined above.

In the production method of the present invention, the content of hexanal in the oral product (amount of hexanal contained in the oral product) is as defined above.

In the production method of the present invention, the content of a component having a plant-derived unpleasant smell in an oral product is as defined above.

The method and conditions for adding the aroma compound to the oral product are not particularly limited and can be appropriately set according to the kind of the oral product, and the like. The time when the aroma compound is added to an oral product is not particularly limited, and, for example, the aroma compound may be added to the starting materials before production of an oral product. Alternatively, a plant or a processed meat product to which an aroma compound was previously added to mask the unpleasant smell may be added to the oral product.

The order of addition of the aroma compound to the oral product is not particularly limited and they may be added in the order of, for example, a plant or processed meat product, and the aroma compound, or may be added in the reverse order. Alternatively, the aroma compound and plant or processed meat product may be simultaneously added to the oral product.

The production method of the present invention may appropriately include, in addition to the addition of an aroma compound to an oral product, a treatment step, a production step, and a cooking step, which are conventionally used in the production of oral products, according to the kind of the oral product to be produced, and the like.

Examples of the oral product to be produced by the production method of the present invention include those similar to the oral products exemplified in the description of the oral product to which the agent of the present invention may be added (mentioned above).

According to the production method of the present invention, an oral product (e.g., food, oral medicine, etc.) in which a plant-derived unpleasant smell such as soybean smell or the like, or an unpleasant smell derived from oxidation of fat or oil, particularly a hexanal odor, is masked can be produced.

The present invention also provides a method for masking an unpleasant smell of an oral product, including adding at least one aroma compound selected from the group consisting of E-beta-damascone, S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, sclareol, and sclareolide (simply referred to as "the masking method of the present invention" at times in the present specification).

The definition and the preferred range of the aroma compound to be used in the masking method of the present invention are as defined above.

The addition amount of the aroma compound to an oral product (amount of the aroma compound to be added to an oral product) and preferred range thereof in the masking method of the present invention are also as defined above.

The method and conditions for adding the aroma compound to an oral product are not particularly limited, and can be appropriately set according to the kind of the oral product, and the like. The time when the aroma compound is added to an oral product is not particularly limited, and, for example, during production of an oral product, after completion of the oral product, or the like can be mentioned. The aroma compound and the plant may be added to the starting materials before production of an oral product. Alternatively, a plant or a processed meat product to which an aroma compound was previously added to mask the unpleasant smell may be added to the oral product.

Examples of the oral product to which the masking method of the present invention is applied include those similar to the oral products exemplified above.

According to the masking method of the present invention, a plant-derived unpleasant smell such as soybean smell or the like of an oral product (e.g., food, oral medicine, etc.) containing a plant such as soybean or the like, or oil-and-fat oxidization smell (particularly, hexanal odor) of a processed meat product can be masked.

Other features of the invention will become apparent in the course of the following descriptions of exemplary embodiments which are given for illustration of the invention and are not intended to be limiting thereof.

EXAMPLES

When "%", "ppm", "ppb", "ppt", and "ppq" are indicated in the present specification, they mean "wt %", "weight ppm", "weight ppb", "weight ppt", and "weight ppq" respectively, unless otherwise specified.

Unless otherwise specified, the materials, reagents, compounds, and the like used in the Examples can be easily obtained or prepared according to methods generally employed in the art, or are commercially available.

Experimental Example 1

Preparation of Evaluation Sample

Each compound shown in Table 1 was added to a 0.5 ppm hexanal aqueous solution at three concentration (addition concentration) levels shown in Table 1 to prepare respective evaluation samples. The concentration levels were set to 1/10 the threshold concentration, threshold concentration, and 10 times the threshold concentration, wherein the threshold is the concentration at which the smell of the compound itself is not sensed when an aqueous solution containing each compound alone is held in the mouth and swallowed.

Evaluation of Hexanal Odor Masking Effect

The hexanal odor intensity when 5 ml of each evaluation sample was held in the mouth and swallowed naturally was evaluated.

With hexanal aqueous solutions prepared to 0.5 ppm, 0.4 ppm, and 0 ppm as the standard, the samples were scored in the range of 0 to 5 points according to the following evaluation criteria. Using a panel of six experts, an average value was obtained for each evaluation sample. The results are shown in Table 1.

Evaluation Criteria

0: hexanal odor intensity of hexanal 0 ppm aqueous solution (hexanal-free water)

3: hexanal odor intensity of hexanal 0.4 ppm aqueous solution

5: hexanal odor intensity of hexanal 0.5 ppm aqueous solution

Evaluation Criteria of Masking Effect

−: hexanal odor intensity of 5 (the same level of intensity as 0.5 ppm hexanal aqueous solution)

+: hexanal odor intensity of not less than 4 and less than 5

++: hexanal odor intensity of not less than 3 and less than 4

+++: hexanal odor intensity of less than 3 (the same level of intensity as 0.4 ppm hexanal aqueous solution)

TABLE 1

| | addition amount | threshold magnification | masking effect |
|---|---|---|---|
| 1-isothiocyanate-3- | 1 ppb | 1/10 threshold | ++ |
| (methylthio)propane | 10 ppb | threshold | + |
| | 100 ppb | ×10 threshold | + |
| S-(2-methyl-3- | 1 ppt | 1/10 threshold | + |
| furyl)ethanethioate | 10 ppt | threshold | + |
| | 100 ppt | ×10 threshold | + |
| beta-caryophyllene oxide | 1 ppt | 1/10 threshold | ++ |
| | 10 ppt | threshold | + |
| | 100 ppt | ×10 threshold | ++ |
| 2,5-dihydroxy-1,4-dithiane | 10 ppt | 1/10 threshold | ++ |
| | 100 ppt | threshold | ++ |
| | 1 ppb | ×10 threshold | ++ |
| E-beta-damascone | 100 ppq | 1/10 threshold | + |
| | 1 ppt | threshold | + |
| | 10 ppt | ×10 threshold | + |

18

TABLE 1-continued

| | addition amount | threshold magnification | masking effect |
|---|---|---|---|
| beta-ionone | 1 ppt | 1/10 threshold | + |
| | 10 ppt | threshold | + |
| | 100 ppt | ×10 threshold | ++ |
| methyl anthranilate | 100 ppt | 1/10 threshold | + |
| | 1 ppb | threshold | + |
| | 10 ppb | ×10 threshold | + |
| sclareol | 10 ppb | 1/10 threshold | +++ |
| | 100 ppb | threshold | ++ |
| | 1 ppm | ×10 threshold | +++ |
| nootkatone | 1 ppb | 1/10 threshold | +++ |
| | 10 ppb | threshold | ++ |
| | 100 ppb | ×10 threshold | ++ |
| sclareolide | 10 ppb | 1/10 threshold | +++ |
| | 100 ppb | threshold | +++ |
| | 1 ppm | ×10 threshold | +++ |
| 1,4-dioxacycloheptadecane- | 1 ppb | 1/10 threshold | ++ |
| 5,17-dione | 10 ppb | threshold | ++ |
| | 100 ppb | ×10 threshold | ++ |
| S-furfuryl thioformate | 100 ppt | 1/10 threshold | ++ |
| | 1 ppb | threshold | ++ |
| | 10 ppb | ×10 threshold | ++ |

As is clear from the results shown in Table 1, hexanal aqueous solutions containing 1-isothiocyanate-3-(methylthio)propane, S-(2-methyl-3-furyl)ethanethioate, beta-caryophyllene oxide, 2,5-dihydroxy-1,4-dithiane, E-beta-damascone, beta-ionone, methyl anthranilate, sclareol, nootkatone, sclareolide, 1,4-dioxacycloheptadecane-5,17-dione, or S-furfuryl thioformate added thereto showed reduced hexanal odor intensity. Thus, it was confirmed that these compounds have the effect of masking the hexanal odor. Among them, 1-isothiocyanate-3-(methylthio)propane, beta-caryophyllene oxide, 2,5-dihydroxy-1,4-dithiane, sclareol, nootkatone, sclareolide, 1,4-dioxacycloheptadecane-5,17-dione, and S-furfuryl thioformate showed remarkable hexanal odor masking effects with addition amounts that are not more than the threshold concentration.

Addition Amount of Each Compound to Hexanal

The addition amount of each compound with respect to 0.5 ppm of hexanal contained in the sample and the results of masking effect are shown in Table 2 to Table 13.

TABLE 2

| | | addition concentration (weight ppb) | | |
|---|---|---|---|---|
| | | $1 \times 10^{-4}$ | $1 \times 10^{-3}$ | $10 \times 10^{-2}$ |
| | | addition amount of compound with respect to hexanal contained in sample (weight ppb) | | |
| compound name | | $2 \times 10^2$ | $2 \times 10^3$ | $2 \times 10^4$ |
| 1 E-beta-damascene | masking effect | + | + | + |

TABLE 3

| compound name | | addition concentration (weight ppb) | | |
| --- | --- | --- | --- | --- |
| | | 1 × 10⁻³ | 1 × 10⁻² | 1 × 10⁻¹ |
| | | addition amount of compound with respect to hexanal contained in sample (weight ppb) | | |
| | | $2 \times 10^3$ | $2 \times 10^4$ | $2 \times 10^5$ |
| 2 S-(2-methyl-3-furyl)-ethanethioate | masking effect | + | + | ++ |

TABLE 4

| compound name | | addition concentration (weight ppb) | | |
| --- | --- | --- | --- | --- |
| | | $1 \times 10^{-3}$ | $1 \times 10^{-2}$ | $1 \times 10^{-1}$ |
| | | addition amount of compound with respect to hexanal contained in sample (weight ppb) | | |
| | | $2 \times 10^3$ | $2 \times 10^4$ | $2 \times 10^5$ |
| 3 beta-caryophyllene oxide | masking effect | ++ | + | ++ |

TABLE 5

| compound name | | addition concentration (weight ppb) | | |
| --- | --- | --- | --- | --- |
| | | $1 \times 10^{-3}$ | $1 \times 10^{-2}$ | $1 \times 10^{-1}$ |
| | | addition amount of compound with respect to hexanal contained in sample (weight ppb) | | |
| | | $2 \times 10^3$ | $2 \times 10^4$ | $2 \times 10^5$ |
| 4 beta-ionone | masking effect | + | + | ++ |

TABLE 6

| compound name | | addition concentration (weight ppb) | | |
| --- | --- | --- | --- | --- |
| | | $1 \times 10^{-2}$ | $1 \times 10^{-1}$ | 1 |
| | | addition amount of compound with respect to hexanal contained in sample (weight ppb) | | |
| | | $2 \times 10^4$ | $2 \times 10^5$ | $2 \times 10^6$ |
| 5 2,5-dihydroxy-1,4-dithiane | masking effect | ++ | ++ | ++ |

TABLE 7

| compound name | | addition concentration (weight ppb) | | |
| --- | --- | --- | --- | --- |
| | | $1 \times 10^{-1}$ | 1 | 10 |
| | | addition amount of compound with respect to hexanal contained in sample (weight ppb) | | |
| | | $2 \times 10^5$ | $2 \times 10^6$ | $2 \times 10^7$ |
| 6 methyl anthranilate | masking effect | + | + | + |

TABLE 8

| compound name | | addition concentration (weight ppb) | | |
| --- | --- | --- | --- | --- |
| | | $1 \times 10^{-1}$ | 1 | 10 |
| | | addition amount of compound with respect to hexanal contained in sample (weight ppb) | | |
| | | $2 \times 10^5$ | $2 \times 10^6$ | $2 \times 10^7$ |
| 7 S-furfuryl thioformate | masking effect | ++ | ++ | ++ |

TABLE 9

| compound name | | addition concentration (weight ppb) | | |
| --- | --- | --- | --- | --- |
| | | 1 | 10 | 100 |
| | | addition amount of compound with respect to hexanal contained in sample (weight ppb) | | |
| | | $2 \times 10^6$ | $2 \times 10^7$ | $2 \times 10^8$ |
| 8 1-isothiocyanate-3-(methylthio)-propane | masking effect | ++ | + | + |

TABLE 10

| compound name | | addition concentration (weight ppb) | | |
| --- | --- | --- | --- | --- |
| | | 1 | 10 | 100 |
| | | addition amount of compound with respect to hexanal contained in sample (weight ppb) | | |
| | | $2 \times 10^6$ | $2 \times 10^7$ | $2 \times 10^8$ |
| 9 nootkatone | masking effect | +++ | ++ | ++ |

TABLE 11

| compound name | | addition concentration (weight ppb) | | |
| --- | --- | --- | --- | --- |
| | | 1 | 10 | 100 |
| | | addition amount of compound with respect to hexanal contained in sample (weight ppb) | | |
| | | $2 \times 10^6$ | $2 \times 10^7$ | $2 \times 10^8$ |
| 10 | 1,4-dioxacyclo-heptadecane-5,17-dione | masking effect | + | + | + |

TABLE 12

| compound name | | addition concentration (weight ppb) | | |
| --- | --- | --- | --- | --- |
| | | 10 | 100 | 1000 |
| | | addition amount of compound with respect to hexanal contained in sample (weight ppb) | | |
| | | $2 \times 10^7$ | $2 \times 10^8$ | $2 \times 10^9$ |
| 11 | sclareol | masking effect | +++ | ++ | +++ |

TABLE 13

| compound name | | addition concentration (weight ppb) | | |
| --- | --- | --- | --- | --- |
| | | 10 | 100 | 1000 |
| | | addition amount of compound with respect to. hexanal contained in sample (weight ppb) | | |
| | | $2 \times 10^7$ | $2 \times 10^8$ | $2 \times 10^9$ |
| 12 | sclareolide | masking effect | +++ | +++ | +++ |

Experimental Example 2

Preparation of Evaluation Sample

Defatted soybean powder (manufactured by DDP Specialty Products Japan K.K., SUPURO 661) was added to water at 4% and the mixture was stirred and stood in a refrigerator overnight to give a supernatant liquid. Each compound shown in Table 14 was added to this aqueous solution at the concentration (addition concentration) levels shown in Table 14 to prepare respective evaluation samples.

Evaluation of Soybean Smell Masking Effect

The soybean smell intensity when 5 ml of each evaluation sample was held in the mouth and swallowed naturally was evaluated.

With the soybean smell intensity of water as 0 point and the soybean smell intensity of defatted soybean aqueous solution as 5 points, the soybean smell intensity of each compound addition section was scored in the range of 0 to 5 points. Using a panel of six experts, an average value was obtained for each evaluation sample. The results are shown in Table 14.

Evaluation Criteria of Masking Effect

−: soybean smell intensity of 5 (level of intensity equal to or higher than that of defatted soybean aqueous solution)

+: soybean smell intensity of not less than 4 and less than 5

++: soybean smell intensity of not less than 3 and less than 4

As is clear from the results shown in Table 14, since the defatted soybean aqueous solutions containing sclareolide, nootkatone, beta-caryophyllene oxide, E-beta-damascone, beta-ionone, sclareol, 1,4-dioxacycloheptadecane-5,17-dione, or 2,5-dihydroxy-1,4-dithiane added thereto showed decreased soybean smell intensity, it was confirmed that these compounds have the effect of masking soybean smell.

TABLE 14

| | addition amount | masking effect |
| --- | --- | --- |
| sclareolide | 100 ppb | ++ |
| | 1 ppm | ++ |
| nootkatone | 100 ppb | ++ |
| | 1 ppm | ++ |
| beta-caryophyllene oxide | 100 ppt | + |
| | 1 ppb | + |
| E-beta-damascone | 10 ppt | + |
| | 100 ppt | ++ |
| beta-ionone | 1 ppt | ++ |
| | 10 ppt | ++ |
| sclareol | 100 ppb | ++ |
| | 1 ppm | + |
| 1,4-dioxacycloheptadecane-5,17-dione | 100 ppb | + |
| | 1 ppm | ++ |
| 2,5-dihydroxy-1,4-dithiane | 1 ppb | ++ |
| | 10 ppb | + |

INDUSTRIAL APPLICABILITY

According to the present invention, foods can be provided in which a plant-derived unpleasant smell such as soybean smell or the like and an unpleasant smell derived from oxidation of fat or oil are masked.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method for masking an unpleasant smell of an oral product, comprising:

adding at least one aroma compound selected from the group consisting of S-(2-methyl-3-furyl) ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, and sclareol to the oral product, wherein the unpleasant smell of the oral product is a hexanal odor of a soybean-containing oral product or a hexanal odor derived from oxidation of fat or oil in a processed meat product, and wherein the amount of the aroma compound added to the oral product is from $2\times10^{-2}$ weight ppm to $2\times10^{7}$ weight ppm, with respect to the hexanal content of the oral product.

2. The method according to claim 1, wherein the aroma compound is added to the oral product in an amount corresponding to $\frac{1}{100}$ to 100 times a threshold value of the aroma compound in the oral product.

3. The method according to claim 1, wherein the aroma compound comprises beta-caryophyllene oxide.

4. The method according to claim 1, wherein the aroma compound comprises sclareol.

5. The method according to claim 1, wherein the aroma compound comprises nootkatone.

6. A method for producing an oral product in which a hexanal odor is masked, comprising:

adding at least one aroma compound selected from the group consisting of S-(2-methyl-3-furyl)ethanethioate, beta-caryophyllene oxide, beta-ionone, 2,5-dihydroxy-1,4-dithiane, methyl anthranilate, S-furfuryl thioformate, 1-isothiocyanate-3-(methylthio)propane, nootkatone, 1,4-dioxacycloheptadecane-5,17-dione, and sclareol to the oral product, wherein the oral product is a soybean-containing oral product or a processed meat product, and wherein the amount of the aroma compound added to the oral product is from $2\times10^{-2}$ weight ppm to $2\times10^{7}$ weight ppm, with respect to the hexanal content of the oral product.

7. The method according to claim 6, wherein the aroma compound is added in an amount corresponding to $\frac{1}{100}$ to 100 times a threshold value of the aroma compound in the oral product.

8. The method according to claim 6, wherein said oral product in which a hexanal odor is masked is selected from the group consisting of a food and an oral medicine.

9. The method according to claim 6, wherein the aroma compound in the oral product is added in an amount corresponding to $\frac{1}{50}$ to 50 times the threshold value of the aroma compound.

10. The method according to claim 6, wherein the aroma compound in the oral product is added in an amount corresponding to $\frac{1}{20}$ to 20 times the threshold value of the aroma compound.

11. The method according to claim 6, wherein the aroma compound in the oral product is added in an amount corresponding to $\frac{1}{10}$ to 10 times the threshold value of the aroma compound.

12. The method according to claim 6, wherein the aroma compound comprises beta-caryophyllene oxide.

13. The method according to claim 6, wherein the aroma compound comprises sclareol.

14. The method according to claim 6, wherein the aroma compound comprises nootkatone.

* * * * *